(12) United States Patent
Sisk

(10) Patent No.: US 7,338,628 B2
(45) Date of Patent: Mar. 4, 2008

(54) RESIN INFUSED ACRYLIC SHELL

(75) Inventor: Thomas J. Sisk, Tottenham (CA)

(73) Assignee: Masco Corporation, Taylor, MI (US)

( * ) Notice: Subject to any disclaimer, the term of this patent is extended or adjusted under 35 U.S.C. 154(b) by 419 days.

(21) Appl. No.: 10/966,651

(22) Filed: Oct. 15, 2004

(65) Prior Publication Data

US 2006/0080769 A1    Apr. 20, 2006

(51) Int. Cl.
*B29C 65/40*    (2006.01)
(52) U.S. Cl. .................. 264/511; 264/263
(58) Field of Classification Search .............. 264/510, 264/511, 279

See application file for complete search history.

(56) References Cited

U.S. PATENT DOCUMENTS

| | | | | |
|---|---|---|---|---|
| 2,913,036 A | * | 11/1959 | Smith | 264/102 |
| 4,943,222 A | * | 7/1990 | Nathoo | 425/89 |
| 5,580,621 A | * | 12/1996 | Kuszaj et al. | 428/34.1 |
| 6,149,844 A | * | 11/2000 | Graham | 264/71 |

* cited by examiner

*Primary Examiner*—Mary Lynn Theisen
(74) *Attorney, Agent, or Firm*—Carlson, Gaskey & Olds

(57) ABSTRACT

An improved method of forming fiber-reinforced plastic shells for bathtubs utilizes a fiber mat placed on a rear surface of a plastic shell. The fiber mat is infused with a resin, and is then cured. The mat and resin are preferably received within a vacuum chamber as the resin is infused. Further, the plastic shell is preferably supported on a fluidized bed during this process. The present invention eliminates the need for detailed air handling as is now required to handle impurities in the industrial air around the process of forming the bathtub shell.

4 Claims, 2 Drawing Sheets

RESIN INFUSED ACRYLIC SHELL

BACKGROUND OF THE INVENTION

This invention relates to an improved method of forming a reinforced bathtub shell.

Currently, tubs such as utilized in bathtubs, whirlpools, etc., are often molded from acrylic. The thin acrylic shell is typically reinforced. One standard method of reinforcing the shell is an open mold spray process, wherein reinforcing fibers are sprayed onto a rear face of the shell.

This spray process requires extensive exhaust air control, including an enclosed space, air handling equipment, etc. Further, permits from government environmental agencies are required for the system.

In addition, the percentage content of resin is somewhat limited by the spray process.

SUMMARY OF THE INVENTION

In a disclosed embodiment of this invention, an acrylic shell is placed upon a support fixture having a fluidized bed for floating the shell. This fluidized bed will compensate for any irregularities in the formation of the individual shells. A vacuum is drawn to pull the shell against the support, floating on the fluidized bed.

A fiber mat or reinforcement is then placed upon the rear of the acrylic shell, and an enclosure, in one embodiment a vacuum bag, is placed around the shell, enclosing the fiber mat. Resin is infused into a port in the vacuum bag, and the resin penetrates and infuses the fiber mat. As the resin cures, the fiber mat hardens against the shell, forming a final bathtub shell.

The water that is utilized as the fluidized bed can be controlled to facilitate the curing process of the infused resin. As an example, to assist in resin flow, while resin is being injected into the vacuum bag, hot water may be utilized. Once the fiber mat has been infused, cool water may be utilized to facilitate the curing.

These and other features of the present invention can be best understood from the following specification and drawings, the following of which is a brief description.

DETAILED DESCRIPTION OF THE PREFERRED EMBODIMENT

Figure 1:
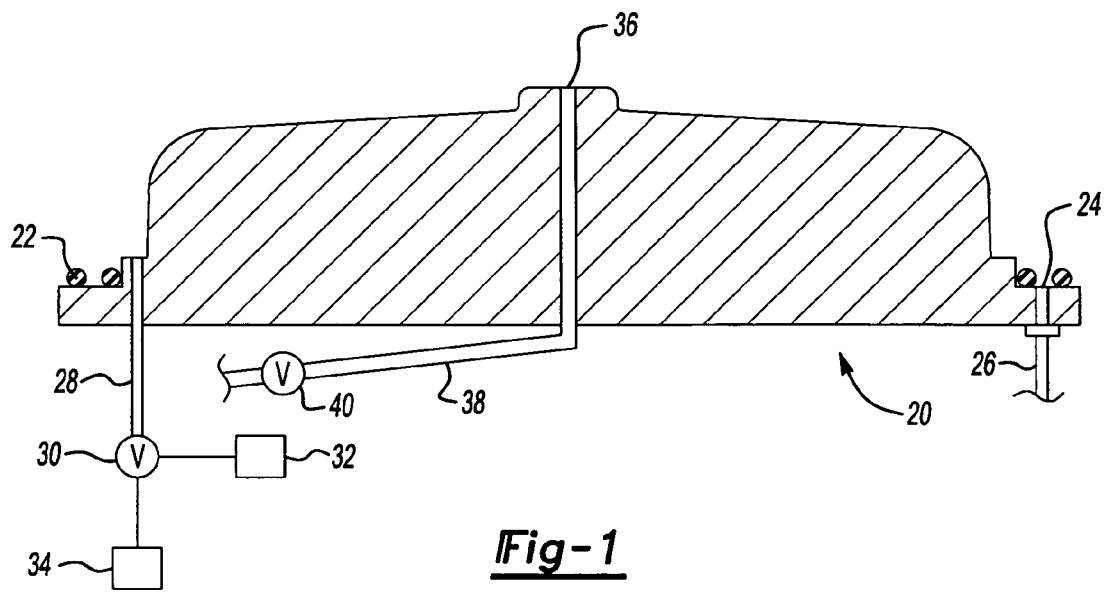
FIG. 1 shows a fixture for forming a bathtub.

FIG. 1 shows a fixture 20, having a gasket seal 22 at an outer periphery, and defining a vacuum chamber 24 between the two gasket seal portions. A source of vacuum 26 is connected to the vacuum chamber 24. Further, a water connection 28 extends to a valve 30 that can selectively deliver either a cool water from a cool water source 32 or a warmer water from a warm water source 34 to the connection 28.

As shown, a drain 36 is formed at an uppermost portion of the fixture 20 and drains water through a pipe 38 controlled by a valve 40.

Figure 2:
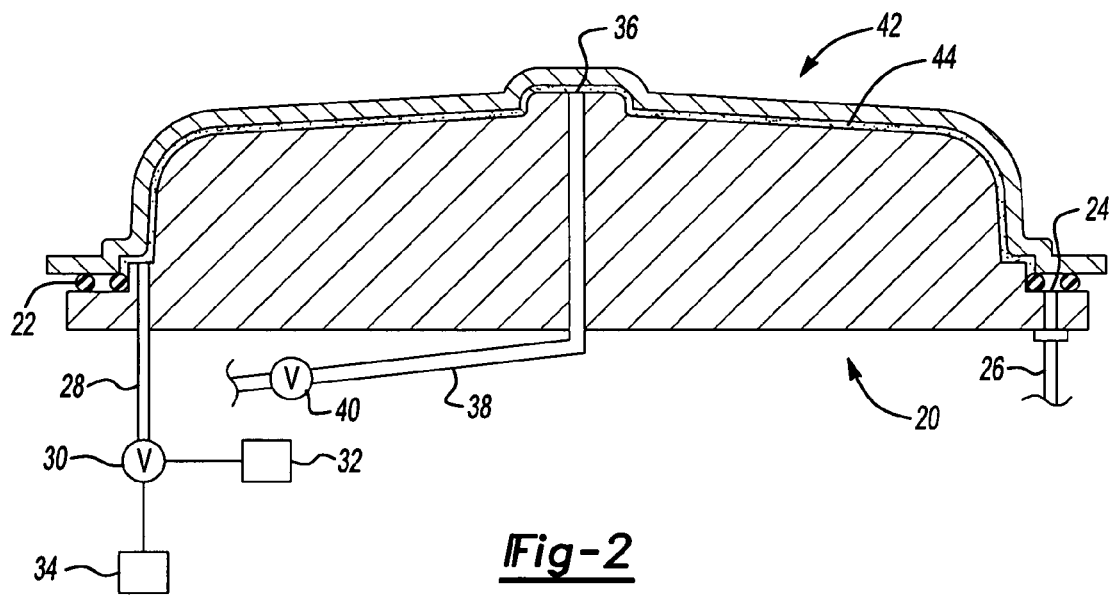
FIG. 2 shows the fixture in a first step according to the present invention.

FIG. 2 shows a first step in forming the inventive bathtub. A molded acrylic shell 42 is placed on the fixture 20. As shown, a fluidized bed 44 is created between an inner surface of the shell 42 and an outer surface of the fixture 20. Water is delivered through the pipe 28, and into the small clearance between the shell and the fixture 20. Excess water will flow through the drain 36, and outwardly through pipe 38.

The fixture 20 is preferably formed such that there will be an intended small clearance relative to shell 42 on the order of, for example, 0.060 inch, to provide the fluidized bed. The fluidized bed ensures that the shell 42 will be firmly supported, regardless of any surface irregularities in the individual formation of the shell 42. The vacuum is drawn on the vacuum chamber 24 and pulls the shell 42 downwardly against the fluidized bed 44 and fixture 20.

Figure 3:
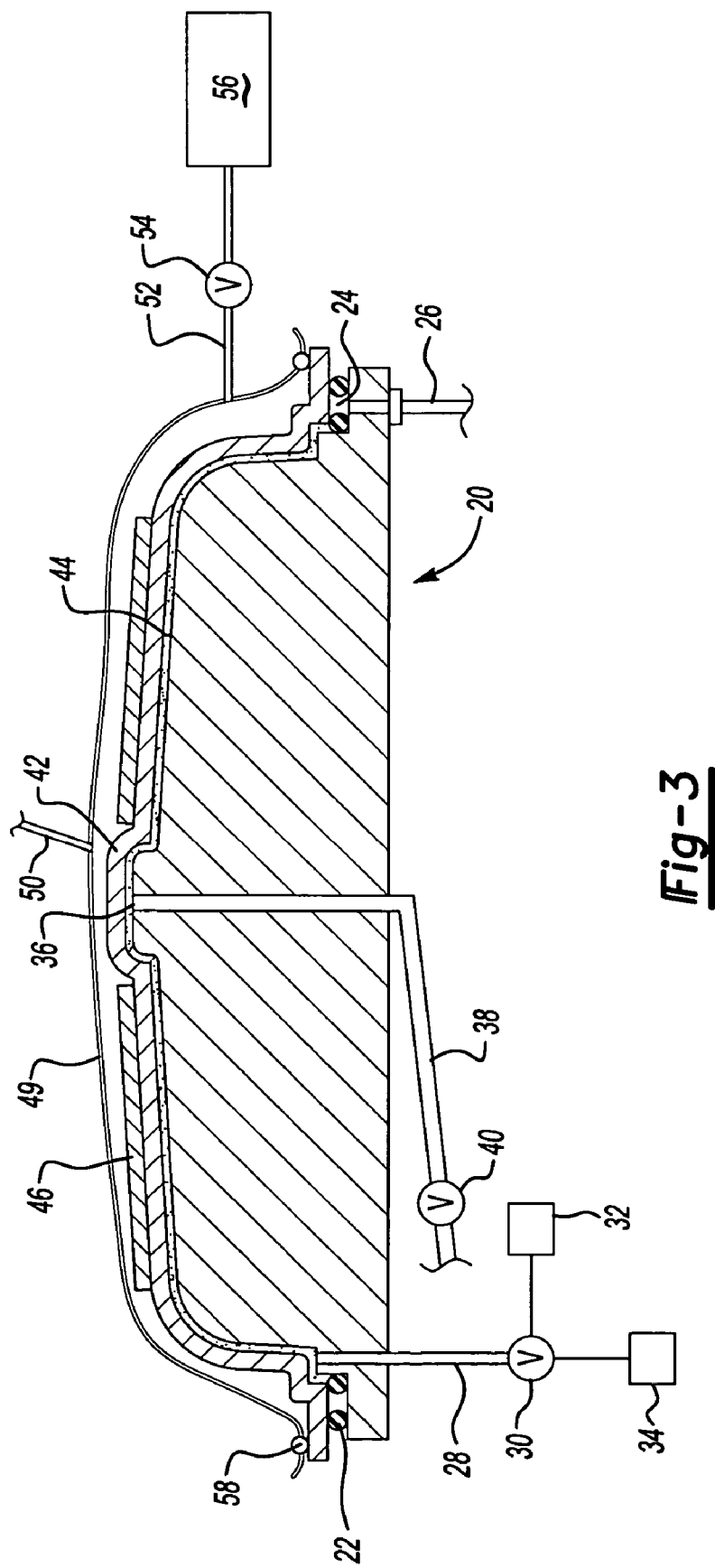
FIG. 3 shows the fixture in a final step.

In the next step, as illustrated in FIG. 3, a fiber mat 46 is placed upon a rear surface of the shell 42. The fluidized bed is still floating the shell 42 and the fiber mat 46. A vacuum bag 49 with a seal 58 at an outer periphery is placed around and sealed to the shell 42. Of course, the vacuum bag 49 could also be sealed to the fixture, or could be sealed to some other structure. The bag 49 has a connection 50 to a vacuum source. A resin infusion port 52 extends through a valve 54 to a source of resin 56. When forming the bathtub, a vacuum 50 is pulled within the vacuum bag 49. Resin is injected through the port 52 and flows to infuse the fiber mat 46. Once sufficient resin has been flowed into the vacuum bag 49 such that the fiber mat 46 is infused, the mat is allowed to cure.

In one embodiment of this invention, the fluidized bed 44 can be utilized to facilitate the curing, such as by utilizing hot water from hot water source 34 while the resin is flowing into the vacuum bag 49, and then switching to cool water from the cool water source 32 to assist in curing.

Figure 4:
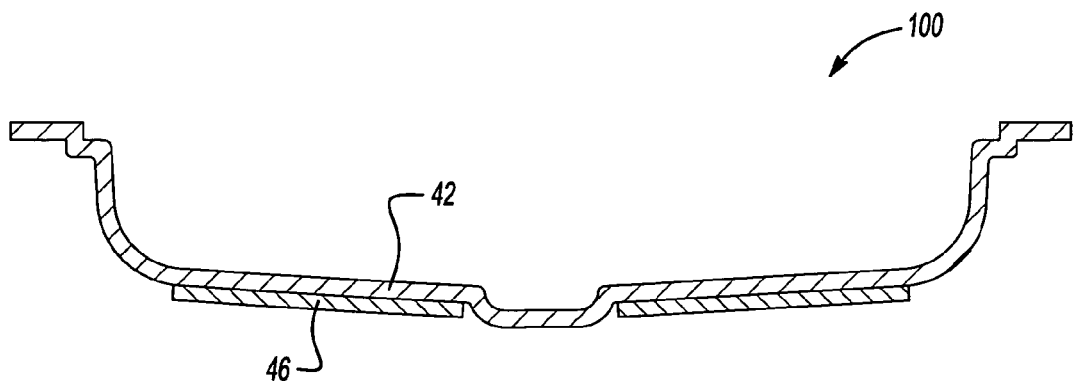
FIG. 4 shows a rough schematic of a bathtub shell formed according to this invention.

FIG. 4 shows the final bathtub 100 with shell 42 and having an underlying support surface from fiber mat 46.

The present invention thus provides a less cumbersome method of forming a fiber-reinforced acrylic shell for use as a bathtub. Of course, the term "bathtub" as utilized in this application extends beyond the traditional bathtub to cover whirlpools, or any other relatively large container for receiving water or other liquids.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of forming a fiber-reinforced plastic shell for a bathtub comprising the steps of:

(1) supporting a plastic shell an a fixture, and delivering a fluidized bed into a space between said fixture and at least a portion of said plastic shell to provide a conformable support for said plastic shell;

(2) pulling a vacuum on said plastic shell to hold said plastic shell on said fluidized bed, and toward said fixture;

(3) placing a fiber mat on a rear surface of said plastic shell, and infusing resin into said fiber mat.

2. The method as set forth in claim 1, wherein a vacuum chamber is provided in said fixture outwardly of said fluidized bed.

3. The method as set forth in claim 1, wherein said fiber mat is received within a sealed chamber outwardly of said plastic shell, as said resin is infused into said fiber mat.

4. The method as set forth in claim 1, wherein said fluidized bed communicates with the source of water at at least two distinct temperatures, and a warmer water is delivered into said fluidized bed as resin is being infused, and a cooler water is delivered to said fluidized bed after resin has been infused.

* * * * *

UNITED STATES PATENT AND TRADEMARK OFFICE
CERTIFICATE OF CORRECTION

PATENT NO.        : 7,338,628 B2  
APPLICATION NO.   : 10/966651  
DATED             : March 4, 2008  
INVENTOR(S)       : Sisk Page 1 of 1

It is certified that error appears in the above-identified patent and that said Letters Patent is hereby corrected as shown below:

Claim 1, Column 2, line 56: "an" should read as --on--

Signed and Sealed this

Twenty-fourth Day of June, 2008

JON W. DUDAS  
*Director of the United States Patent and Trademark Office*